US010402324B2

(12) United States Patent
Lim et al.

(10) Patent No.: US 10,402,324 B2
(45) Date of Patent: Sep. 3, 2019

(54) MEMORY ACCESS FOR BUSY MEMORY BY RECEIVING DATA FROM CACHE DURING SAID BUSY PERIOD AND VERIFYING SAID DATA UTILIZING CACHE HIT BIT OR CACHE MISS BIT

(71) Applicant: Hewlett Packard Enterprise Development LP, Houston, TX (US)

(72) Inventors: Kevin T. Lim, Palo Alto, CA (US); Sheng Li, Palo Alto, CA (US); Parthasarathy Ranganathan, Palo Alto, CA (US); William C. Hallowell, Houston, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 160 days.

(21) Appl. No.: 15/032,329

(22) PCT Filed: Oct. 31, 2013

(86) PCT No.: PCT/US2013/067756
§ 371 (c)(1),
(2) Date: Apr. 27, 2016

(87) PCT Pub. No.: WO2015/065426
PCT Pub. Date: May 7, 2015

(65) Prior Publication Data
US 2016/0275014 A1 Sep. 22, 2016

(51) Int. Cl.
*G06F 12/0802* (2016.01)
*G06F 13/38* (2006.01)

(52) U.S. Cl.
CPC ........ *G06F 12/0802* (2013.01); *G06F 13/385* (2013.01)

(58) Field of Classification Search
None
See application file for complete search history.

(56) References Cited

U.S. PATENT DOCUMENTS

| 4,051,355 A | 9/1977 | Lin |
| 4,055,851 A | 10/1977 | Jenkins et al. |
| 4,365,294 A | 12/1982 | Stokken |

(Continued)

FOREIGN PATENT DOCUMENTS

JP 2012252530 A 12/2012

OTHER PUBLICATIONS

Ham, Tae Jun, et al., "Disintegrated Control for Energy-Efficient and Heterogeneous Memory Systems", Duke University, Jun. 12, 2013, 12 Pages.

(Continued)

*Primary Examiner* — Rocio Del Mar Perez-Velez
*Assistant Examiner* — Chie Yew
(74) *Attorney, Agent, or Firm* — Hewlett Packard Enterprise Patent Department

(57) ABSTRACT

According to an example, a processor generates a memory access request and sends the memory access request to a memory module. The processor receives data from the memory module in response to the memory access request when a memory device in the memory module for the memory access request is busy and unable to execute the memory access request.

8 Claims, 5 Drawing Sheets

(56) References Cited

U.S. PATENT DOCUMENTS

| | | | |
|---|---|---|---|
| 4,438,494 A | 3/1984 | Budde et al. | |
| 4,764,862 A | 8/1988 | Barlow et al. | |
| 5,018,063 A * | 5/1991 | Liu | G06F 12/0822 |
| | | | 711/121 |
| 5,097,470 A | 3/1992 | Gihl | |
| 5,197,026 A * | 3/1993 | Butler | G11C 7/00 |
| | | | 365/185.08 |
| 5,515,521 A * | 5/1996 | Whitted | G06F 9/3802 |
| | | | 711/213 |
| 5,787,457 A | 7/1998 | Miller et al. | |
| 6,044,441 A * | 3/2000 | Malinowski | G06F 12/0802 |
| | | | 711/144 |
| 6,349,390 B1 | 2/2002 | Dell et al. | |
| 6,944,738 B2 | 9/2005 | Dong | |
| 6,996,016 B2 | 2/2006 | Oh | |
| 7,180,807 B2 | 2/2007 | Park | |
| 7,366,862 B2 | 4/2008 | Nystlien et al. | |
| 8,028,257 B2 | 9/2011 | Allen et al. | |
| 8,081,537 B1 | 12/2011 | Bhakta et al. | |
| 8,135,935 B2 | 3/2012 | Haertel et al. | |
| 8,209,479 B2 | 6/2012 | Rajan et al. | |
| 8,291,126 B2 | 10/2012 | Zitlaw | |
| 9,268,652 B1 * | 2/2016 | Salyers | G06F 16/27 |
| 2001/0023466 A1 | 9/2001 | Farmwald et al. | |
| 2002/0056020 A1 | 5/2002 | Sartore et al. | |
| 2002/0056022 A1 * | 5/2002 | Leung | G06F 12/0893 |
| | | | 711/106 |
| 2002/0194548 A1 | 12/2002 | Tetreault | |
| 2003/0159013 A1 | 8/2003 | Frank et al. | |
| 2003/0196032 A1 | 10/2003 | Dong | |
| 2003/0204792 A1 | 10/2003 | Cahill et al. | |
| 2003/0221069 A1 | 11/2003 | Azevedo et al. | |
| 2004/0024967 A1 * | 2/2004 | Zhang | G06F 12/0802 |
| | | | 711/118 |
| 2004/0205299 A1 * | 10/2004 | Bearden | G06F 12/0862 |
| | | | 711/137 |
| 2005/0097276 A1 * | 5/2005 | Lu | G06F 12/0893 |
| | | | 711/118 |
| 2006/0015679 A1 * | 1/2006 | Keeth | G06F 12/0893 |
| | | | 711/104 |
| 2006/0062047 A1 | 3/2006 | Bhakta et al. | |
| 2006/0236032 A1 * | 10/2006 | Campbell | G06F 12/0866 |
| | | | 711/118 |
| 2007/0005922 A1 | 1/2007 | Swaminathan et al. | |
| 2007/0067532 A1 | 3/2007 | Tischler | |
| 2007/0101094 A1 * | 5/2007 | Thayer | G06F 12/0804 |
| | | | 711/202 |
| 2007/0165481 A1 | 7/2007 | Norris et al. | |
| 2008/0010418 A1 | 1/2008 | Kao | |
| 2008/0183959 A1 | 7/2008 | Pelley et al. | |
| 2008/0195719 A1 | 8/2008 | Wu et al. | |
| 2009/0063785 A1 | 3/2009 | Gower et al. | |
| 2009/0177909 A1 | 7/2009 | Tahara | |
| 2010/0005206 A1 | 1/2010 | Hnatko et al. | |
| 2010/0030973 A1 * | 2/2010 | Speight | G06F 12/0862 |
| | | | 711/137 |
| 2010/0042778 A1 | 2/2010 | Tanguay et al. | |
| 2010/0115181 A1 | 5/2010 | Tillgren | |
| 2010/0293325 A1 | 11/2010 | Maheshwari | |
| 2010/0323725 A1 | 12/2010 | Cai et al. | |
| 2011/0125966 A1 | 5/2011 | Amidi et al. | |
| 2011/0249515 A1 | 10/2011 | Liu et al. | |
| 2012/0110388 A1 | 5/2012 | Lavery | |
| 2012/0151159 A1 | 6/2012 | Muralimanohar | |
| 2012/0159045 A1 | 6/2012 | Hinkle et al. | |
| 2012/0159072 A1 | 6/2012 | Hida et al. | |
| 2012/0185733 A1 | 7/2012 | Carman et al. | |
| 2012/0226884 A1 | 9/2012 | Tokuhiro et al. | |
| 2012/0290810 A1 | 11/2012 | Lecler et al. | |
| 2012/0297231 A1 | 11/2012 | Qawami et al. | |
| 2012/0307575 A1 | 12/2012 | Aiso | |
| 2012/0311249 A1 | 12/2012 | Koya | |
| 2013/0117641 A1 | 5/2013 | Bains et al. | |
| 2014/0013187 A1 | 1/2014 | Blaunstein | |
| 2014/0281680 A1 | 9/2014 | Nemazie et al. | |
| 2014/0359181 A1 | 12/2014 | Benedict | |

OTHER PUBLICATIONS

PCT Search Report/Written Opinion~Application No. PCT/US2013/067756 dated Aug. 13, 2014~10 pages.

Altera Corporation, "Avalon Interface Specifications", (Research Paper), Apr. 2009 Version 1.2, 66 pages. Available at: http://www.uni-ulm.de/fileadmin/website_uni_ulm/iui.inst.050/vorlesungen/sose09/lrob/mnl_avalon_spec.pdf.

Extended European Search Report in EP Application No. 13888427.5, dated Feb. 6, 2017, 7 pages.

Extended European Search Report in EP Application No. 13889937.2, dated Mar. 20, 2017, 5 pages.

Freescale Semiconductor, Inc., "PowerQUICC and QorIQ DDR3 SDRAM Controller Register Setting Considerations", (Research Paper), Jan. 2012, 34 pages.

International Preliminary Report on Patentability in PCT Application No. PCT/US2013/048120, dated Jan. 7, 2016, 9 pages.

International Preliminary Report on Patentability in PCT Application No. PCT/US2013/052031, dated Feb. 4, 2016, 6 pages.

International Searching Authority, "The International Search Report and the Written Opinion", PCT Application No. PCT/US2013/052031, dated Apr. 9, 2014, 9 Pages.

International Searching Authority, "The International Search Report and the Written Opinion", PCT Application No. PCT/US2013/048120, dated Mar. 28, 2014, 12 Pages.

Wikipedia's Field-Programmable Gate Array historical version from Jun. 19, 2013; 13 pages. https://en.wiki ped ia.org/w/i ndex. ph p?title= Field-programmable gate_array&oldid=560665851 (Year: 2013).

* cited by examiner

MEMORY ACCESS FOR BUSY MEMORY BY RECEIVING DATA FROM CACHE DURING SAID BUSY PERIOD AND VERIFYING SAID DATA UTILIZING CACHE HIT BIT OR CACHE MISS BIT

BACKGROUND

Double data rate (DDR) memory is a type of dynamic random access memory (DRAM) which transfers data on both the rising edge and the falling edge of the clock. DDR1-DDR4 refer to different generations of DDR technology with DDR4 being the most recent. Generally, each new generation may improve power consumption or data rate.

Current ubiquitous DDR memory interfaces have strict timing requirements for how long memory can take to respond to normal memory operations, such as read or write. These timing requirements leave little opportunity to perform any operations that may take a longer time than a few nanoseconds. If a longer time is taken, the processor may generate a non-maskable interrupt (NMI) to the operating system to indicate a potential memory error/failure.

BRIEF DESCRIPTION OF DRAWINGS

The embodiments are described in detail in the following description with reference to examples shown in the following figures.

DETAILED DESCRIPTION

Figure 1A:
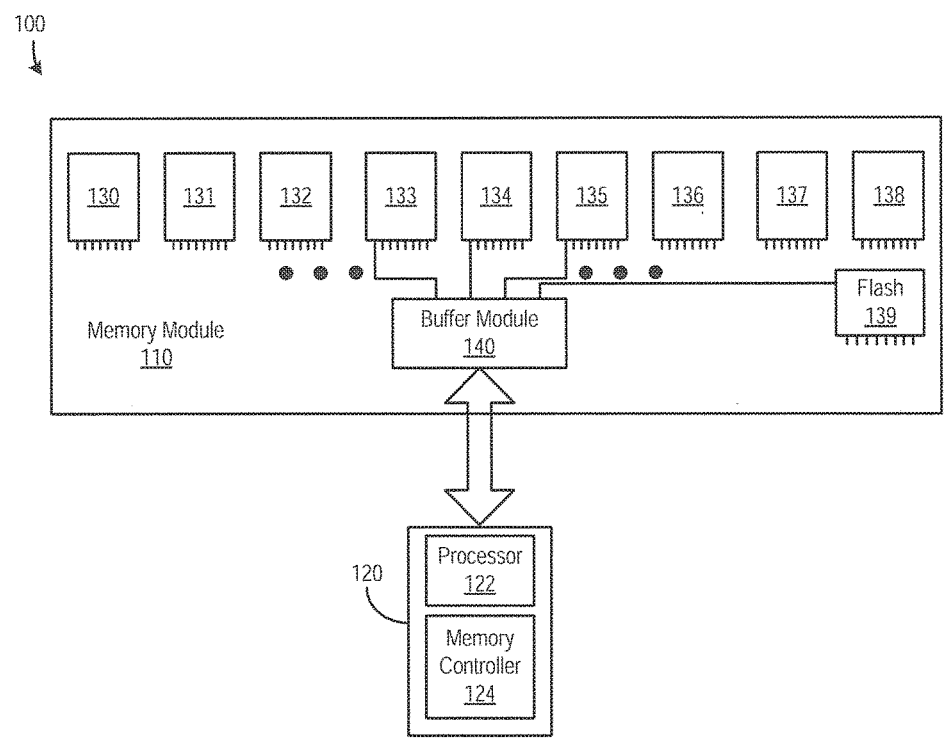
FIG. 1A illustrates a memory interface system for enabling continued memory module responses concurrent with non-standard memory operations according to an example of the present disclosure.

A memory module, such as a dual in-line memory module (DIMM), can respond to memory access requests from a processor even when the memory devices on the memory module are busy performing another operation, which may include a non-standard memory operation. The memory module includes a memory buffer to enable other operations to occur concurrently with standard memory accesses. A cache is included for example with the memory buffer to enable data to be serviced from the cache during periods when the memory module is in use for other operations. Prefetchers may fill the cache with data likely to be used in the near future. If the data requested by the processor is in the cache, then it can be returned properly. If it is not, then the memory module can still respond to the request, but with predetermined data (e.g., a specific data pattern such as 0xDEADBEEF) to indicate that the memory module is in use.

A register may be included at the memory buffer and the register may be memory mapped to a specific address. This register is updated by the memory buffer on each memory access to indicate if the data was found in the buffer's cache. The register is populated with the address of the last access (with the cache offset bits cleared), and includes values to indicate a cache hit or miss, such as, for example, its lowest most bit is set to 1 to indicate a hit, and a 0 to indicate a miss.

A memory interface, which for example is provided with the memory buffer and may be implemented as machine readable instructions, determines when the memory buffer is used for operations which may include non-standard memory operations such as moving data between Flash and DRAM, or performing computations. During these operations, the memory interface can continue to send memory access requests to the memory devices in the memory module. For example, the memory interface first reads the desired address, and then checks the register to see if its access was successful in returning data. This enables the memory module to continue to be used during periods of non-standard memory operations, and avoids returning errors to the processor during those times.

The non-standard memory operations temporarily utilize the memory module and may cause the memory module to be unavailable to the processor if the methods and memory buffer described in the examples herein are not implemented. An example of the non-standard memory operations may include moving data between DRAM (for speed and regular accessing) and flash memory (for non-volatility and greater capacity). Other examples of the non-standard memory operation may include "Active Memory" or "Processing-in-Memory," which add logic near or in the memory to allow certain non-standard memory operations, such as filtering, searching or compressing.

DDR3 and other DDR specifications include timing requirements that limit the ability of DIMMs to execute anything other than replies to standard DDR commands. A processor may instruct a memory controller to micromanage every operation of DRAM. Accordingly, if the DRAM does not respond in a preconfigured time, the processor may instruct the memory controller to consider the DRAM as corrupted or dead and may perform a check to determine if the DRAM is still functioning. The memory interface and methods described in the examples herein allow the DRAM to respond and stay compliant with DDR3 specifications while implementing non-standard memory operations. The memory interface and methods may be implemented for example at a memory buffer (e.g., buffer-on-board, DIMM buffer) or into a three-dimensional (3D) stacked memory to allow sufficient time to perform non-standard memory operations.

FIG. 1A illustrates an example of a memory interface system 100 for enabling continued memory module responses concurrent with non-standard memory operations or any other memory operations. The memory interface system 100 may include a memory module 110 and an integrated circuit (e.g., system-on-chip) 120.

The integrated circuit 120 includes a processor 122, for example a central processing unit (CPU), that instructs a memory controller 124 to send memory access requests to the memory module 110 and to receive data from the memory module 110 even when a memory device, such as one of memory devices 130-138, on the memory module 110 is busy performing a non-standard memory operation or any other memory operation.

The memory module 110 may, for example, be a DIM. The memory module 110 may include a buffer module 140, memory devices 130-138, and flash memory 139. The buffer module 140 may, for example, be a buffer-on-board, a load reduced (LR) buffer, etc. According to an example, the buffer module 140 may be implemented inside the memory module 110 using 3D stacking technology. The buffer module 140 may be coupled to the integrated circuit 130, memory devices 130-138, and flash device 139. The memory devices 130-138 may, for example, be DRAM devices. According to another example, the memory controller 124 may be included in the memory module 110. In yet another example, the memory controller 124 may be external to the integrated circuit 120 and the memory module 110.

Figure 1B:
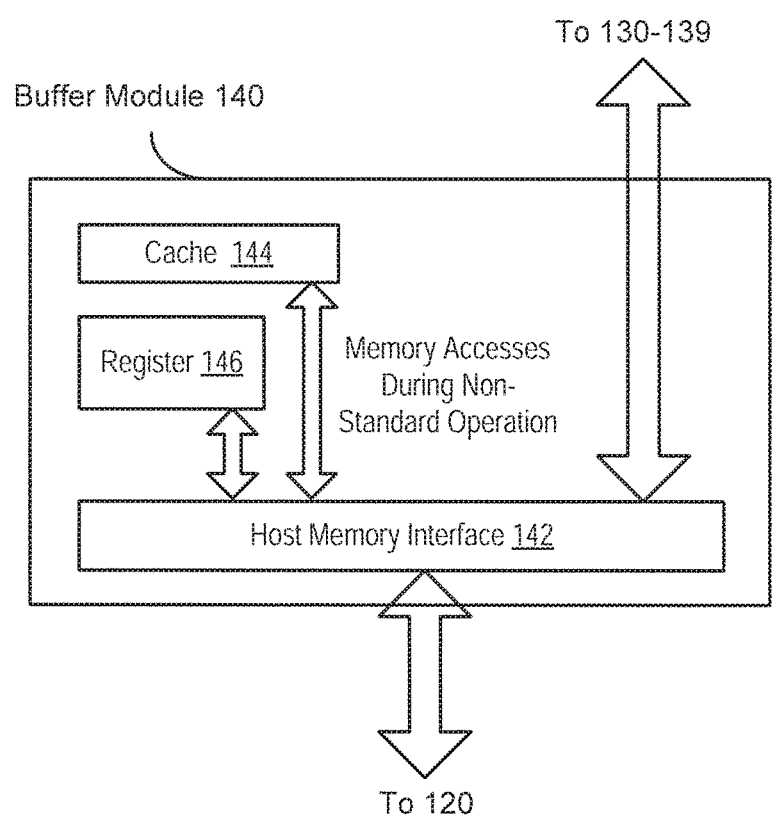
FIG. 1B illustrates a buffer module on a memory module according to an example of the present disclosure.

FIG. 1B illustrates an example of the buffer module 140 of the memory module 110. The buffer module 140 may include a host memory interface 142 to receive requests from the processor 122, determine whether the memory devices 130-138 are busy, redirect the requests to an appropriate one of the memory devices 130-138, and return data to the requesting processor 122. The buffer module 140 includes a cache 144 and a register 146. The cache 144 services accesses to memory devices 130-138 that may be busy performing a non-standard memory operation, such as migration of data between the memory devices 130-138 and the flash device 139. The register 146 allows the memory module 110 to convey whether the cache 144 was able to respond to a request by the processor 122 with correct data.

The cache 144 caches data so that the memory module 110 may respond to any requests that access the cached addresses. By caching data, the memory module 110 may continue to operate even if a DRAM that stores the requested data is in use by another operation. For example, DRAMs are normally single ported and only allow one operation to occur at a time. According to an example, the data in the cache 144 may include data that has recently been accessed from the memory module 110, thus taking advantage of temporal locality, or can be data that has been prefetched into the cache 144 in anticipation of future use.

Figure 2:
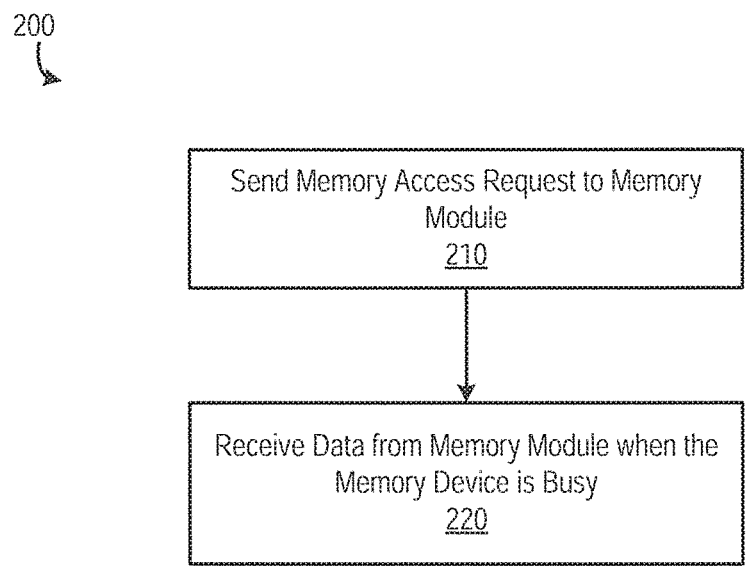
FIG. 2 illustrates a process for requesting data from a memory device that is currently busy performing another operation according to an example of the present disclosure.

FIG. 2 illustrates an example of a process 200 for requesting data from a memory device, such as one of the memory devices 130-138 that is currently busy performing another operation, which may include a non-standard memory operation. The process 200 may be implemented by the integrated circuit 120, which includes, for example, processor 122 and memory controller 124 shown in FIG. 1A.

In block 210 the processor 122 instructs the memory controller 124 to send a memory access request to the memory module 110. The memory access request may include a read or write command. The memory controller 124 sends the memory access request to the memory module 110. The memory controller 124 may be connected to multiple memory modules and may determine that the memory module 110 is the memory module for this particular memory access so that it can send the memory access request to the memory module 110. In block 220, in response to the memory access request, the processor 122 receives data from the memory module 110 even when the memory device that includes the memory address for the memory access request on the memory module 100 is busy performing another operation, which may include a non-standard memory operation. For example, as is further described in the process 400 below, if the memory device corresponding to the memory access request is busy, the memory interface 142 shown in FIG. 1B may return a value from the cache 144 if there is a cache hit for the memory access request or a predetermined data pattern if there is a cache miss. For example, the predetermined data pattern indicates to the processor 122 that the memory module is busy and the processor needs to re-send the memory access request.

Figure 3:
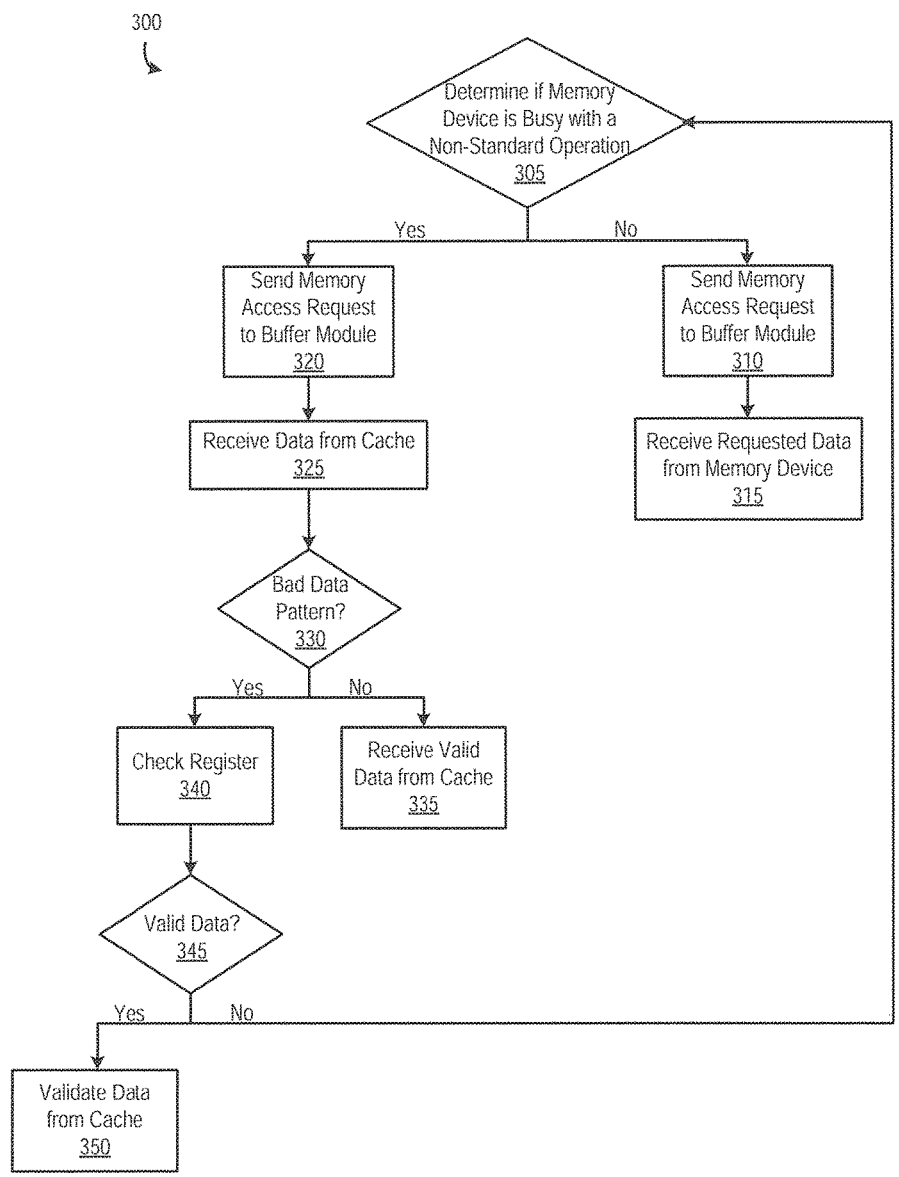
FIG. 3 illustrates a process for requesting data from a memory device that is currently busy with another operation in further detail according to an example of the present disclosure.

With reference to FIG. 3, an example of a process 300 for requesting data from the memory device that is currently busy with a another operation, which may include a non-standard memory operation, is shown in greater detail. This process 300, according to an example, also checks the validity of the returned data. The process 300 may be implemented by the integrated circuit 120, which includes processor 122 and memory controller 124.

At block 305, a determination is made as to whether the memory device that includes the memory address requested by the processor 122 is busy performing a non-standard memory operation. According to an example, the processor 122 may determine and control whether the memory device is busy performing another operation, including a non-standard memory operation.

If the memory device is not determined to be busy performing another memory operation e.g., by the processor 122, then a memory access request is sent to the buffer module 140 to access the requested data, as shown in block 310. For example, when sending a memory access request, a command (e.g., read or write) is issued to a specific memory address of the memory device, and this command may be broken down into several specific DDR commands such as pre-charge, row access, or column access. Accordingly, in block 315, the processor 122 may then receive data returned from the requested address in the memory device via the buffer module 140.

If the processor 122 determines at block 305 that the memory device is currently busy performing a non-standard memory operation, a two-phase approach to access the requested data may be executed. To maintain functionality of the memory interface system 100, which may be at all times, a response to the data request is generated with data stored in the cache 144 of the buffer module 140. The data stored in the cache 144 may not always be valid data as discussed in blocks 330-345 below. For example, the requested data may not be stored in the cache 144. In this case, the buffer module will retrieve possibly invalid data to respond to the processor's memory access request. Thus by responding to the processor's memory access requests, a potential NMI memory error/failure may be averted.

According to an example, data stored in the cache 144 may be prefetched through user-defined prefetch functions. Prefetchers may use patterns such as linear accesses or strides to predict future accesses. A user, however, may have a better understanding of how data is accessed during non-standard memory operations than the hardware. Therefore, according to an example, a region of memory on each memory device may be set aside for the user to write machine-readable instructions to that location to direct prefetching patterns for the cache 144. The machine-readable instructions may be a simple look up table, which based on one memory location access, may prefetch a different memory location, or a more complex function based on traversing through a binary tree structure, for example.

As shown in block 320, when it is determined that the memory device is busy with a memory operation which may be a non-standard memory operation, the process 300 accesses the requested data by sending a memory access request to the buffer module 140. Since the memory device is currently busy with a non-standard memory operation, the buffer module 140 attempts to retrieve the requested data from the cache 144. The processor 122 then receives data from the cache 144 as shown in block 325. As mentioned above, a response to each of the processor's memory access requests is generated, but the data returned by the cache 144 may not always be valid data. For example, the cache 144 may not have previously stored or prefetched the requested data.

Thus, in block 330, a determination is made by the processor 122 as to whether the data retrieved from the cache 144 matches a predetermined bad data pattern, such as 0xDEADBEEF. If the data retrieved from the cache 144 does not match the predetermined bad data pattern, then the data returned to the processor 122 is determined to be valid, as shown in block 335. That is, if the data retrieved from the cache 144 does not match the predetermined bad data pattern, the requested data is stored in the cache 144.

However, if the data retrieved from the cache 144 matches the predetermined bad data pattern, as shown in block 330, then the validity of the retrieved data is checked against a specific memory location that is mapped to the register 146 in the buffer module 140, as shown in block 340. That is, since the data retrieved from the cache 144 matches the predetermined bad data pattern, it indicates that the retrieved data may potentially be invalid and is checked against the register 146.

The register 146 may include a combination of a last memory address to access the cache 144 (with the processor-level cache line offset bits cleared) and either a 0 or a 1 in the lowest most bit, which indicates that the access either missed (0) or hit (1) in the buffer's cache 144. The register 146 may provide validation that the access to the requested address has succeeded. By checking the retrieved data, the process 300 may avoid repeated accesses to the memory device.

As shown in block 345, the data retrieved from the cache 144 is checked for validity against the register 146. If the data retrieved from the cache 144 is valid, then the retrieved data is validated by the register 146, as shown in block 350. That is, the requested data exists in the cache 144.

If the data retrieved from the cache 144 is not valid (e.g., a cache miss), the data is returned to the processor 122 within deterministic timing. That is, the retrieved data may be a bad data pattern, such as 0xDEADBEEF. Therefore, by maintaining responses to memory access requests under all conditions with deterministic timing, the process 300 avoids invoking any error detection/recovery mechanisms on the processor.

In the case where the retrieved data is not valid, the processor 122 may continue sending a memory access request until the memory device is done performing the non-standard memory operation, as shown in blocks 305, 310, and 315. In the case of multiple users of the memory module 110, the process 300 for example may employ a back-off mechanism to heuristically ensure that at least one access succeeds. That is, deadlock does not occur as long as the non-standard memory operation eventually completes.

Figure 4:
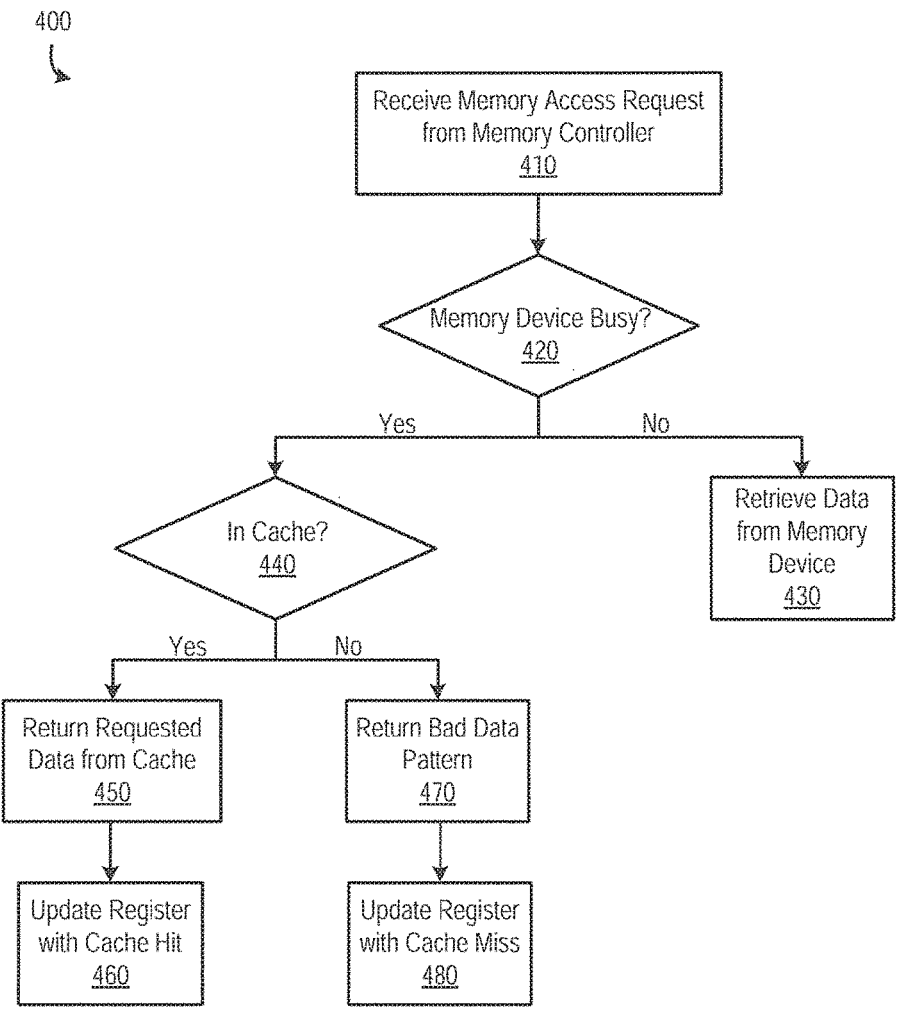
FIG. 4 illustrates a process for retrieving requested data by the buffer module according to an example of the present disclosure.

With reference to FIG. 4, an example of a process 400 for a buffer module 140 to retrieve data from a busy memory device is shown. The process 400 may be implemented by hardware within the host memory interface 142 of the buffer module 140.

In block 410, the buffer module 140 receives a memory access request from the processor 122 via the memory controller 124. According to an example, the buffer module 140 determines whether the memory device is currently busy performing another operation, which may include a non-standard memory operation, as shown in block 420.

If the buffer module 140 determines that the memory device is not busy performing a non-standard memory operation, the buffer module 140 retrieves the requested data from the memory device and sends the requested data to the processor 122, as shown in block 430.

However, if the buffer module 140 determines that the memory device is currently busy performing a non-standard memory operation, the data module 140 performs a cache lookup for the requested data, as shown in block 440. As shown in block 450, if the requested data is found in the cache 144, then the buffer module 140 returns the requested data from the cache 144 to the processor 122, and updates the register 146 to indicate a cache hit (i.e., the requested data is found in the cache 144), as shown in block 460. As shown in block 470, if the requested data is not found in the cache 144, then the buffer module 140 may return a bad data pattern to the processor 122, and update the register 146 to indicate a cache miss (i.e., the requested data is not found in the cache 144), as shown in block 480.

Technical effects and benefits of the disclosed examples include enabling the memory module 110 to respond to a processor's memory access request when the memory device on a memory module 110 is busy performing a non-standard memory operation. According to a disclosed example, a buffer module 140 on the memory module 110 may include a cache 144 to return data to the memory access request and a register 146 to validate the data retrieved from cache 144 when the memory device is busy performing another operation. According to a further technical effect and benefit, a disclosed example allows a user to define a cache prefetching function.

As will be appreciated by one skilled in the art, aspects of the present disclosure may be embodied as a system, method, and/or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the embodiments have been described with reference to examples, various modifications to the described embodiments may be made without departing from the scope of the claimed features.

What is claimed is:

1. An integrated circuit, comprising:
    a memory controller; and
    a processor to:
        generate a memory access request for data of a first memory device in a memory module;
        determine whether the first memory device is busy performing another operation;
        in response to a determination that the first memory device is busy performing the another operation, instruct the memory controller to send the memory access request to the memory module to retrieve the data of the first memory device from a cache of the memory module;
        receive data from the cache of the memory module in response to the memory access request;
        determine whether the data received from the cache is the requested data of the first memory device by determining whether the data received from the cache matches a predetermined invalid data pattern;
        in response to a determination that the data received from the cache matches the predetermined invalid data pattern: (1) determine that the data received from the cache is not the requested data of the first memory device and instruct the memory controller to continue sending the memory access request to the memory module until the first memory device is done performing the another operation; and (2) check a register in the memory module to validate the data received from the cache, the register including an address of a last memory access request and a bit value indicating a cache hit or cache miss, wherein:
            if it is determined that the bit value in the register indicates the cache hit, the processor is to determine that the data received from the cache is the requested data, and
            if it is determined that the bit value in the register indicates the cache miss, determine that the data received from the cache is not the requested data and instruct the memory module to continue sending the memory access request to the memory module until the first memory device is done performing the another operation; and
        in response to a determination that the data received from the cache does not match the predetermined invalid data pattern, determine that the received data is the requested data of the first memory device.

2. The integrated circuit of claim 1, wherein the another operation is a non-standard memory operation.

3. The integrated circuit of claim 2, wherein the non-standard memory operation comprises at least one of migrating data between the first memory device and flash memory and performing memory-side computation on the data.

4. The integrated circuit of claim 1, wherein the processor is to receive data retrieved from the first memory device in the memory module in response to the memory access request when the first memory device is not busy.

5. A computer-implemented method, comprising:
    sending, by a processor, a memory access request to a memory module for data in a first memory device in the memory module after determining that the first memory device is busy performing another operation;
    receiving data from a cache of the memory module in response to the memory access request;
    determining, by the processor, whether the data received from the cache of the memory module matches a predetermined invalid data pattern;
    in response to a determination that the data received from the cache of the memory module matches the predetermined invalid data pattern: (1) determining, by the processor, that the received data is not the requested data of the first memory device and continuing sending, by the processor, the memory access request for the data of the first memory device to the memory module until the first memory device is done performing the another operation; and (2) checking, by the processor, a register in the memory module to validate the data received from the cache, the register including an address of a last memory access request and a bit value indicating a cache hit or cache miss, wherein:
        if it is determined, by the processor, that the bit value in the register indicates the cache hit, determine, by the processor, that the data received from the cache is the requested data, and
        if it is determined, by the processor, that the bit value in the register indicates the cache miss, determine, by the processor, that the data received from the cache is not the requested data and continue sending, by the processor, the memory access request to the memory module until the first memory device is done performing the another operation; and
    in response to a determination that the data received from the cache of the memory module does not match the predetermined invalid data pattern, determining, by the processor, that the received data is the requested data of the first memory device.

6. The computer-implemented method of claim 5, wherein the another operation is a non-standard memory operation.

7. The computer-implemented method of claim 6, wherein the non-standard memory operation comprises at least one of migrating data between the first memory device and flash memory and performing memory-side computation on the data.

8. The computer-implemented method of claim 5, the method further comprising receiving data from the first memory device in the memory module in response to the memory access request when the first memory device is not busy performing the another operation.

* * * * *